United States Patent [19]

Satake et al.

[11] Patent Number: 4,500,577

[45] Date of Patent: Feb. 19, 1985

[54] METAL PIPE COATED WITH THERMOPLASTIC SYNTHETIC RESIN

[75] Inventors: Jiro Satake; Tetsuzo Arai, both of Amagasaki; Kivokazu Tanaka; Eiji Mikami, both of Ibaraki; Tsuneo Moriyasu; Tadasu Nakagawa, both of Neyagawa, all of Japan

[73] Assignees: Sumitomo Kinzoku Kogyo Kabushiki Kaisha; Nippon Paint Kabushiki Kaisha, both of Osaka, Japan

[21] Appl. No.: 557,388

[22] Filed: Dec. 1, 1983

Related U.S. Application Data

[63] Continuation of Ser. No. 371,854, Apr. 26, 1980, abandoned, which is a continuation of Ser. No. 148,338, May 9, 1980, abandoned, which is a continuation-in-part of Ser. No. 026,382, Apr. 2, 1979, abandoned.

[30] Foreign Application Priority Data

Apr. 7, 1978 [JP] Japan .................................. 53-41594

[51] Int. Cl.³ ................................................ B32B 1/08
[52] U.S. Cl. ...................................... 428/36; 428/460; 428/462; 428/506; 138/143; 138/145; 138/DIG. 1; 525/133
[58] Field of Search ................ 428/36, 460, 461, 462, 428/463, 465, 506, 517–519, 520; 156/334, 335, 338; 138/DIG. 1, 143, 141, 145, 146; 525/133

[56] References Cited

U.S. PATENT DOCUMENTS

| | | | |
|---|---|---|---|
| 2,610,910 | 9/1952 | Thomson | 138/DIG. 1 |
| 3,294,866 | 12/1966 | Soldatos | 156/335 |
| 3,560,420 | 2/1971 | Tamura et al. | 156/335 X |
| 3,759,780 | 9/1973 | Rizzer | 156/335 |
| 3,817,922 | 6/1974 | Barth | 156/335 X |
| 3,843,576 | 10/1974 | Parkinson | 156/335 X |
| 3,967,020 | 6/1976 | Uemura et al. | 428/36 |
| 4,127,545 | 11/1978 | Callan et al. | 525/133 X |
| 4,129,472 | 12/1978 | Hobes et al. | 138/DIG. 1 |
| 4,133,796 | 1/1979 | Bullman | 156/335 X |

FOREIGN PATENT DOCUMENTS

| | | | |
|---|---|---|---|
| 151101 | 4/1951 | Australia | 525/133 |
| 79193 | 7/1976 | Japan | 428/36 |
| 38549 | 3/1977 | Japan | 260/28 P |

*Primary Examiner*—Alexander S. Thomas
*Attorney, Agent, or Firm*—Ladas & Parry

[57] ABSTRACT

A metal pipe melt-coated with a thermoplastic synthetic resin using an adhesive composition which contains as major components 5–50 parts by weight of an oil-soluble phenol resin, 5–60 parts by weight of an ethylene copolymer and 5–50 parts by weight of a petroleum hydrocarbon compound having a mean molecular weight in the range of 50,000 to 1,000,000.

2 Claims, No Drawings

METAL PIPE COATED WITH THERMOPLASTIC SYNTHETIC RESIN

This is a continuation of Ser. No. 371,854 filed Apr. 26, 1980, abandoned which is a continuation of application Ser. No. 148,338 filed May 9, 1980 abandoned which is a CIP of Ser. No. 26,382 filed Apr. 2, 1979 abandoned.

This invention relates to metal pipes the outer surfaces of which are coated with a thermoplastic synthetic resin such as polyolefin, and more particularly to metal pipes having on the exterior thereof a coat layer of a thermoplastic synthetic resin of a suitable hardness which is excellent in adhesion, water resisting property and shock resistance.

BACKGROUND

There have been developed and proposed various metal pipes which are coated with a thermoplastic synthetic resin such as polyethylene, polyvinylchloride and the like. For example, it is known to produce metal pipes coated with polyethylene by depending powder of polyethylene on the outer surface of a preheated metal pipe and melting the polyethylene powder completely by a heat treatment. The coated metal pipes of this sort show good initial adhesion between the polyethylene coat layer and the metal pipe but the adhesion between the two parts is soon lowered during use of the coated pipes due to the inferior water resisting property of the coated layer.

It is also known to use an adhesive when coating metal pipes to adhere the coating material to the metal pipe surfaces with the aid of the adhesive. For instance, ethylene copolymers such as ethylene-vinyl acetate copolymer, and ethylene-ethylacrylate copolymer are known to be useful as adhesives in the production of coated metal pipes. The coat layers of the resulting coated pipes show relatively good initial adhesion but, once damaged, they are easily peeled off over a wide area due to poor water resistant property of the adhesive.

Also known in the art is the method of coating metal pipes with use of a hot-melt type adhesive tape which has a plasticizer and a tackifier blended with a basic rubber material, as described in U.S. Pat. Nos. 3,802,908 and 3,823,045. Such hot melt type adhesive hardens and becomes brittle under low temperature conditions as in winter, loosing its ability of adhesion to a considerable degree to lower the adhesion between the adhesive layer and the coat layer as well as the shock resistance thereof. On the other hand, the hot metal type adhesive softens when exposed to high temperatures in summer to result in a lowered adhesive property and tends to exude when a load is imposed on the pipe, as a result lowering the adhesion as well as the resistance to corrosion.

OBJECTS

It is an object of the present invention to provide a metal pipe which is coated with a thermoplastic synthetic resin such as polyolefin.

It is another object of the present invention to provide a metal pipe which is securely coated with a thermoplastic synthetic resin such as polyolefin.

It is still another object of the present invention to provide a metal pipe covered with a coat layer of a thermoplastic synthetic resin such as polyolefin with excellent adhesion, water resisting property and shock resistance over a wide temperature range.

It is a further object of the present invention to provide a metal pipe which is coated with a thermoplastic synthetic resin such as polyolefin and which has an adhesive layer of a hardness which withstands bending or other mechanical machining operations of the pipe.

The foregoing objects are achieved by a metal pipe which is exteriorly coated with a protective layer of a thermoplastic synthetic resin through an adhesive material comprising (a) 5–50 parts by weight of oil soluble phenol resin, (b) 5–60 parts by weight of an ethylene copolymer, and (c) 5–50 parts by weight of a petroleum hydrocarbon compound having a mean molecular weight in the range of 50,000 to 1,000,000.

EMBODIMENTS

Examples of the oil soluble phenol resin useful in the present invention include 100% phenol resin, phenol resins modified with a dry oil such as tuning oil, linsed oil and dehydrated castor oil and phenol resins modified with a natural resin such as rosin and terpene resin. Preferred oil soluble phenol resins are 100% phenol resins, especially condensates of alkylphenol and formaldehyde, more particularly, alkylphenol having alkyl group of 5–12 carbon atoms and condensates of nonylalkylphenol, amylphenol and formaldehyde.

The ethylene copolymers useful in the present invention are copolymers of ethylene and copolymerizable monomers, more particularly, ethylene-vinyl acetate copolymer, ethylene-acrylic acid copolymer, ethylene-methacrylic acid copolymer and ethylene-methacrylate copolymer. Preferred ethylene copolymers are ethylene-vinyl acetate copolymer and ethylene-ethylacrylate copolymer.

The ethylene copolymer preferably has a melt index value of 0.5–400, more has a melt index value of 0.5–25 preferably at least 1 . If the melt index value of the ethylene copolymer is smaller than 0.5, the viscosity of the adhesive composition is increased to such a degree as to make its production difficult and its adhesion to a metal is lowered. On the other hand, to high a melt index value results in an adhesive composition of low viscosity and low adhesion to a metal.

The melt index values herein referred to are the values measured by the method prescribed in ASTMD1238.

Examples of the petroleum hydrocarbon compound with a mean molecular weight of 50,000 to 1,000,000 include styrene-butadiene rubber, polybutadiene rubber, isoprene rubber, butyl rubber, nitrile rubber, chloroprene rubber and halogenated compounds of the above-mentioned synthetic rubber. Among these, styrene-butadiene rubber or butyl rubber is preferred.

The rubber material has a mean molecular weight of 50,000 to 1,000,000, preferably 200,000 to 800,000. A mean molecular weight lower than 50,000 results in low adhesion at high temperatures while a mean molecular weight over 1,000,000 results in an unduly high viscosity of the adhesive composition, rendering its production very difficult.

The proportion of the styrene component in styrene-butadiene rubber is preferred to be lower than 50% since greater styrene proportions will lower the adhesion of the composition at lower temperatures.

In the present invention, 5–40 parts by weight of a tackifier may be blended with the above-mentioned composition. A blending amount less than 5 parts by weight produces a composition with low adhesion to a metal while a blending amount greater than 40 parts by weight result in deterioration of the adhesion at high temperatures and extruding physical properties of the composition. Examples of suitable tackifiers include petroleum resin such as aromatic petroleum resin, aliphatic petroleum resin and acrylic petroleum resin, terpene resins such as alpha- pinene polymer resin, beta-pinene polymer resin and dipentene polymer, and rosins such as natural rosin, polymerized rosin, hydrogenated rosin and esters of those rosins. Preferred tackifiers are aliphatic petroleum resin and terpene resin.

In preparing the adhesive composition according to the present invention, the above-mentioned essential components are blended in particular proportions in order to achieve the purposed mentioned hereinbefore.

More particularly, the adhesive composition comprises a blend of (a) 5–50 parts by weight, preferably 10–25 parts by weight of an oil soluble phenol resin, (b) 5–60 parts by weight, preferably 20–45 parts by weight of an ethylene copolymer, and (c) 5–50 parts by weight, preferably 15–40 parts by weight of a petroleum hydrocarbon compound.

Where the proportion of the oil soluble phenol resin is smaller than 5 parts by weight, the adhesion to a metal and the water resisting property are lowered. On the other hand, and oil soluble phenol resin proportion greater than 50 parts by weight lowers the adhesion at low temperatures and deteriorates the extruding physical properties.

In a case where the proportion of the ethylene copolymer resin is smaller than 5 parts by weight, the adhesion at high temperatures will be lowered, with poor extruding physical properties. On the contrary, a proportion greater than 60 parts by weight will lower the wettability of and adhesion to a metal surface and the water resisting property.

If the proportion of the petroleum hydrocarbon compound is less than 5 parts by weight, the adhesion at low temperatures and the extruding physical properties are lowered. A petroleum hydrocarbon compound content in excess of 50 parts by weight will lower the adhesion at high temperatures and the hardness of the composition, causing exudation of the composition upon application of a load.

The respective essential components are blended in the above-defined proportions and, if necessary, admixed with 0.1–5 parts by weight of a thermal stabilizer (antioxidant), for example, an ordinary amine such as N-N'-diphenyl-p-phenylenediamine, N-phenyl-beta-naphthylamine, and polymerized 2,2,4-trimethyl-1,2-hydroquinoline, or a phenol such as 2,6-di-tert-butyl-p-cresol, 4,4'-thiobis (6-tert-butyl-m-cresol) and 2,5-di-tert-butylhydroquinone, and less than 20 parts by weight of an inorganic filler material such as calcium carbonate and talc. The inorganic filler material, if admixed in an amount over 20 parts by weight, lowers the adhesion of the composition. In addition, the thermal stabilizer does not give the antioxidant effect in an amount less than 0.1 part by weight and its effect does not increase in a commensurating degree even admixed more than 5 parts by weight.

For producing the adhesive composition according to the present invention, the best method is to put the abovementioned blend in a hot kneader for mixing it under heating conditions. The heating temperature is normally in the range of 120° C. to 180° C., preferably in the range of 130° C. to 160° C.

The thermoplastic synthetic resins useful in the present invention for forming the protective coat layer include polyolefin resins such as polyethylene and polypropylene, polyvinyl chloride, and the like, and copolymers thereof.

As for the method which is useful in the present invention for adhering a polyolefin resin to a metal, for example, to a steel pipe with use of the above-described adhesive composition, it is recommended to extrude the adhesive composition into a 200 to 600 microns thick film by an extruder at 70° C. to 160° C. while interposing the extruded film between the coating polyolefin resin and the metal pipe which is preheated to 70° C. to 220° C. thereby adhering the coating resin to the pipe.

For the extrusion of the adhesive composition, it is possible to employ the T-die extrusion method or the round-die extrusion method.

The T-die extrusion method is suitable for use in coating metal pipes of large diameters, while the round-die extrusion is suitable for pipes of small diameters.

The adhesive composition to be used in this particular coating method suitably has a melt index value in the range of 0.5 to 30, preferably 1 to 15. A composition with a melt index value smaller than 0.5 is inferior in wettability of the metal surface and has lowered adhesion. On the other hand, a composition with a melt index value greater than 30 has inferior extrudability and suffers from film breakages.

For reference, the melt index value of the adhesive compositions employed are indicated in the examples which are given hereinafter.

By using the adhesive composition as mentioned above, it becomes possible to obtain a metal pipe coated with a thermoplastic cynthetic resin layer which retains excellent adhesion over a wide temperature range as well as excellent water resisting property and shock resistance suitable for undergound installation, with strengths which can withstand bending or other machining operation of the pipe.

Production of Adhesive Composition

The adhesive compositions used in the present invention were produced in the following manner. Referring to Table 1, the compositions 1 to 8 and comparative compositions 9 to 12 were each charged into a hot kneader and mixed for 2 hours with heating at 150° C. to prepare the respective adhesives. The values of melt index and penetration of each composition were measured to determine its properties.

EXAMPLES 1–8

A steel pipe (diameter=4.8 inches) which had been cleaned by shot blast and preheated to 150° C. was uniformly covered with the adhesive composition of the invention of Table 1 by extruding the composition through a T-die spirally into a film of about 300 microns thick. Immediately thereafter, high density polyethylene (density=0.940) was extruded likewise through a T-die and spirally melt-coated in the form of a uniform film with a thickness of about 3 m/m to obtain a polyethylene-coated steel pipe.

TABLE 1

| | Production of adhesive Composition | | | | | | | | | | | | |
|---|---|---|---|---|---|---|---|---|---|---|---|---|---|
| | Example of Invention | | | | | | | | Comparative Example | | | | Commercial Product |
| | Composition Number | | | | | | | | | | | | |
| Components & Properties | 1 | 2 | 3 | 4 | 5 | 6 | 7 | 8 | 9 | 10 | 11 | 12 | 13 |
| Components (parts by weight) | | | | | | | | | | | | | |
| *(a) Oil soluble phenol resins* | | | | | | | | | | | | | |
| 100% Alkyl Phenol Resin (Softening point 100° C., Number of carbon atoms: 8) | 15 | 10 | 10 | 10 | 10 | — | — | — | 15 | 18 | — | 10 | Asphalt-Rubber Adhesive (3) |
| Phenol resin modified with natural resin (natural resin: rosin, softening point: 110° C.) | — | — | — | — | — | 20 | 15 | — | — | — | — | — | |
| Dry oil modified phenol resin (dry oil: linseed oil softening point: 90° C.) | — | — | — | — | — | — | — | 10 | — | — | — | — | |
| *(b) Ethylene copolymer* | | | | | | | | | | | | | |
| Ethylene-Ethylacrylate copolymer (MT: 35, Ethylacrylate content 20%) | 40 | 30 | 0 | 30 | 0 | 40 | 30 | 40 | 40 | — | 75 | 10 | |
| Ethylene-Vinyl Acetate copolymer (NI: 2, Vinyl Acetate content 25%) | — | — | 30 | — | 30 | — | — | — | 25 | — | 25 | — | |
| *(c) Petroleum hydrocarbon compounds* | | | | | | | | | | | | | |
| Styrene-Butadiene Rubber (Molecular weight: 300,000 Styrene content 23%) | 15 | — | 15 | 25 | — | — | — | — | 3 | 20 | — | 25 | |
| Butyl Rubber (Molecular weight: 350,000) | — | 25 | 15 | — | 20 | 35 | 25 | 30 | — | 5 | — | 10 | |
| *(d) Tackifier* | | | | | | | | | | | | | |
| Aliphatic Petroleum Resin (Softening point: 130° C.) | 30 | 30 | 30 | 10 | 30 | — | 30 | 20 | 17 | 30 | — | 25 | |
| Terpene Resin (Softening point: 100° C.) | — | — | — | 20 | — | — | — | — | — | — | — | — | |
| *Filler* | | | | | | | | | | | | | |
| Talc (Whitness: 73%, Specific gravity 2.8) | — | 5 | 10 | 5 | 10 | 5 | — | — | — | 12 | — | 15 | |
| Proportions of matter | | | | | | | | | | | | | |
| MI Value (1) | 1.6 | 1.2 | 1.0 | 1.9 | 1.7 | 1.9 | 1.5 | 1.4 | 8 | 10 | 1.6 | 3.0 | — |
| Penetration (20° C.) (2) | 9 | 9 | 18 | 15 | 13 | 14 | 10 | 11 | 10 | 20 | 13 | 50 | 35 |

(1) MI Value: ASTM1238 (125° C./2160 g)
(2) Penetration: JIS K 2530
(3) Product of Nippon Paint, Undercoat S-13 (Trade name)
Asphalt 70 parts by weight
Styrene-butadiene Rubber 20 parts by weight
Talc 10 parts by weight The adhesive compositions of the Commercial Product and Comparative Examples in Table 1 were used in the same manner to produce polyethylene-coated steel pipes, except that the pipe preheating temperature was 150° C. for Comparative Examples 9 and 10, 200°–220° C. for Comparative Example 11, 50°–60° C. for Commercial Product 13.

Table 2 below comparatively shows the properties of the respective coated steel pipes with regard to adhesion, brine electrolysis test, brine immersion, and shock resistance.

The test shown in Table 2 were carried out according to the following procedures.

1. 180° Peeling Test

A 10 mm wide kerf of a prescribed length reaching the pipe surface is cut through the coat film longitudinally along a steel pipe which is coated with high density polyethylene, and the out end of the coated film was peeled and turned over 180°. The turned film end was pulled axially at a speed of 50 mm/min to deter-

TABLE 2

| | | Composition Number | | | | | | | | | | | | |
|---|---|---|---|---|---|---|---|---|---|---|---|---|---|---|
| | | Example of Invention | | | | | | | | Comparative Examples | | | | Commercial Product |
| | | Examples | | | | | | | | | | | | |
| Properties | | 1 | 2 | 3 | 4 | 5 | 6 | 7 | 8 | 9 | 10 | 11 | 12 | 13 |
| 180° C. Peeling Strength (Kg/cm) | −20° C. | 6.0 | 7.0 | 6.5 | 6.8 | 6.0 | 7.5 | 6.5 | 7.0 | 6.5 | 1 | 8.0 | 5.0 | 0 |
| | 20° C. | 4.9 | 6.5 | 4.7 | 5.0 | 4.5 | 6.0 | 5.5 | 6.0 | 6.0 | 2 | 7.0 | 2.4 | 20 |
| | 50° C. | 2.3 | 2.5 | 2.0 | 1.7 | 1.8 | 1.9 | 2.0 | 2.0 | 2.5 | 1 | 2.5 | 0.5 | 0.1 |
| Brine Electrolysis test (mm) | | 14 | 12 | 12 | 14 | 14 | 12 | 14 | 13 | 32 | 15 | 40 | 12 | 2 |
| Brine Immersion (mm) | | 4 | 2 | 3 | 3 | 5 | 2 | 4 | | 10 | 4 | 15 | 5 | 8 |
| Shock Resistance (number of hammering) | | 6–7 | 6–7 | 6–7 | 7 | 6–7 | 6–7 | | 7 | 4 | 7 | 3–4 | 3–4 | | mined the force in the unit of kg/cm which was required to peel off the film.

2. Brine Electrolysis Test

An opening of 6 mm in diameter reaching the pipe surface was formed in the coat film of a steel pipe which is coated with high density polyethylene, and the steel pipe was immersed in 3% salt solution of 20° C. After application of −3 V DC thereto for one month, the diameter of the peeled range around the opening was measured and indicated in mm.

3. Brine Immersion test

After immersing steel pipe coated with high density polyethylene immersed in 3% salt water of 60° C. for 14 days, the distance of permeation of salt water from the end of the coated steel pipe was measured and indicated in mm.

4. Shock Resistance Test

A steel pipe coated with high density polyethylene was struck with a force of 35 kg-cm using a hammer with a ½ inch striking head, counting the number of hammering until a pin hole appeared in the coated film.

As clear from Table 2, the steel pipes with the polyethylene coat film according to the present invention are excellent in adhesion, water resisting property and shock resistance.

EXAMPLE 9

A steel pipe (diameter 4 inches) which had been cleaned by shot blast was preheated to 170° C. and coated uniformly with the adhesive composition 1 of Table which was extruded in the form of an about 300 microns thick film at 150° C. through a round die. Immediately thereafter, polypropyrene (density) 0.950 ) heated to 250° C. was likewise extruded through a round die and uniformly melt-coated on the pipe in a film thickness of about 3 m/m.

The coated steel pipe showed extremely good adhesion and water resisting property as shown in Table 3 below.

TABLE 3

|  |  | Polypropylene-Coated Steel Pipe According to Example 3 | Polypropyle-Coated Steel Pipe Using Commercial Product 13 |
|---|---|---|---|
| 180° | −20° C. | 5.5 | 0 |

TABLE 3-continued

|  |  | Polypropylene-Coated Steel Pipe According to Example 3 | Polypropyle-Coated Steel Pipe Using Commercial Product 13 |
|---|---|---|---|
| Peeling Strength (Kg/cm) | 20° C. | 4.0 | 1.5 |
|  | 50° C. | 2.5 | 0.1 |
| Brine Electrolysis Test (mm) |  | 15 | 25 |
| Brine Immersion (mm) |  | 5 | 8–10 |

EXAMPLE 10-12

Different kinds of metal pipes (copper, aluminum and galvanized steel pipes of 4 inches diameter) which had been cleaned were heated to 150° C. and uniformly coated firstly with the adhesive composition 2 of Table 2 which was extruded through a round die at 150° C. into a film of about 350 microns thickness. Immediately thereafter, polyethylene (density=0.940) heated to 220° C. was extruded likewise through a round die and melt-coated thereon in a film thickness of about 3 m/m to obtain polyethylene-coated metal pipes.

The coated metal pipes showed excellent adhesion and water resisting properties as shown in Table 4 below.

TABLE 4

| Metal Pipe |  | Example 10 Steel | Example 11 Aluminum | Example 12 Galvanized Steel |
|---|---|---|---|---|
| 180° Peel Strength (Kg/cm) | −20° C. | 5.0 | 5.0 | 4.5 |
|  | 20 | 4.5 | 4.5 | 4.0 |
|  | 50 | 2.0 | 2.0 | 2.5 |
| Brine Immersion (mm) |  | 5 | 4 | 4 |
| Shock Resistance (number of hammering) |  | 6–7 | 6–7 | 7 |

Having described our invention, we claim:

1. A coated metal pipe having the exterior surface thereof coated with a protective film of a thermoplastic synthetic resin through an adhesive material consisting essentially of:
   (a) about 10% by weight of an oil soluble alkyl phenol resin
   (b) about 30% by weight of an ethylene-ethylacrylate resin having a melt index of 25
   (c) about 25% by weight butyl rubber and
   (d) about 30% of aliphatic petroleum resin having a softening point of 130° C.,
   the balance being inorganic filler material.

2. A coated metal pipe according to claim 1 wherein said synthetic resin protective coating is a hot melt applied polyolefin coating.

* * * * *